United States Patent Office 2,708,660
Patented May 17, 1955

2,708,660

SOLUBLE OIL RUST INHIBITORS

Samuel E. Jolly, Prospect Park, Pa., assignor to Sun Oil Company, Philadelphia, Pa., a corporation of New Jersey No Drawing. Application July 29, 1950,
Serial No. 176,767

16 Claims. (Cl. 252—42.7)

This invention relates to new chemical compounds having particular utility as rust-inhibiting additives for soluble oil, and to soluble oil containing such compounds or related rust-inhibiting materials.

Soluble oil, as herein contemplated, is essentially a homogeneous mixture of mineral lubricating oil and an emulsifying agent, the soluble oil being capable of dilution with water to form oil-in-water emulsions. Aqueous emulsions of soluble oils are widely used as cutting oils in metal-working operations, and as slushing oils for the protection of metal surfaces against oxidation.

High quality soluble oils for use in aqueous emulsion as coolants in metal-working are required to have certain properties, including non-corrosiveness to metals, the ability to remain homogeneous under storage conditions, the ability to form stable oil-in-water emulsions, and the ability to form emulsions capable of inhibiting rusting of metal under service conditions. Rust inhibition is particularly important in order that objectionable rust will not form on machined parts when the cutting oil emulsion remains thereon as a thin film in contact with air for a substantial period of time after the machining operation.

In order to improve the rust-inhibiting properties of soluble oil, rust inhibiting additives can be added thereto. A suitable rust-inhibiting additive must not only improve the rust-inhibiting properties of emulsions of the soluble oil; it must also have no adverse effect on the stability of the soluble oil itself or on its emulsifiability or on the stability or permanence of emulsions of the oil. It is also desirable that the additive be capable of improving the rust-inhibiting properties of both hard and soft water emulsions of soluble oil: some soluble oils are relatively easy to inhibit against rusting when in hard water emulsions, but relatively difficult to inhibit when in soft water emulsions.

Relatively few materials are suitable from all viewpoints as soluble oil rust inhibitors. Many which will inhibit against rusting in emulsions made with one type of water will not inhibit in emulsions made with another type. Many will inhibit some types of soluble oil, but not others. Many materials which will inhibit a soluble oil against rusting will at the same time render the oil incapable of forming stable emulsions: emulsions of soluble oils containing such material undergo "creaming," or phase separation upon standing, an oil-rich layer forming on top of the soluble oil.

The present invention provides new chemical compounds which have been found to be capable of inhibiting diverse types of soluble oil against rusting when in emulsion with either hard or soft water, and which have been found to be capable, when used in soluble oil in concentrations as subsequently specified, of providing inhibited soluble oils having satisfactory emulsion properties.

The new chemical compounds according to the invention are reaction products of a mercaptothiazol material and an imidazoline having the following formula:

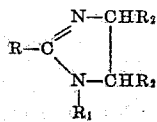

where R is an aliphatic radical having 8–20 carbon atoms, $R_1$ is a radical having molecular weight less than 75, and $R_2$ is hydrogen or a lower alkyl group having for Example 1 or 2 carbon atoms. Mixtures of mercaptothiazols and/or mixtures of imidazolines having the above formula can be used to make reaction products according to the invention.

Mercaptothiazol compounds, as contemplated here, are compounds having the following structure:

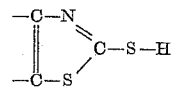

hydrogen, aliphatic radicals, aromatic radicals, or arylene radicals, etc., being attached to the open carbon linkages. Mercapto-aryl thiazols such as mercaptobenzothiazol are particularly suitable mercaptothiazols, but others can be used, as will be shown subsequently in the examples.

According to the present invention, soluble oils are prepared containing reaction products as specified above, or containing other rust-inhibiting materials closely related thereto. That is, instead of a chemical reaction product of mercaptothiazol and imidazoline as specified above, physical mixtures of such imidazoline with an alkali metal mercaptide or alkaline earth metal mercaptide of such mercaptothiazol can be used with good rust-inhibiting effect in diverse types of soluble oil when in emulsion with either hard or soft water.

The invention thus contemplates soluble oil containing a rust-inhibiting additive material comprising imidazoline and mercaptothiazol materials as herein specified, either in the form of a reaction product of imidazoline and mercaptothiazol, or in the form of a physical mixture of the imidazoline material and an alkali metal or alkaline earth mercaptide of the mercaptothiazol material.

Imidazolines for use according to the present invention may be either solids or liquids at ordinary temperatures. They can be prepared by any known method, e. g. by the method disclosed in U. S. Patent 2,267,965 to Alexander L. Wilson issued December 30, 1941, in which method a carboxylic acid is reacted with ethylene diamine or an N-substituted ethylene diamine or other compound capable of reacting with a carboxylic acid to give a substituted imidazoline. For example, 2-hendecyl imidazoline can be prepared by reacting lauric acid with ethylene diamine according to the above method; and 1-hydroxyethyl-2-hendecyl imidazoline can be prepared by reacting lauric acid with N-hydroxyethyl ethylene diamine according to that method. Any other method for preparing substituted imidazolines may be used.

Prepared imidazolines for use according to the present invention are those wherein R in the above formula is an aliphatic radical having 10–12 carbon atoms, and $R_1$ is a radical having molecular weight of about 25–50. $R_1$ also preferably but not necessarily comprises hydrogen and carbon atoms, either alone or with oxygen and/or nitrogen atoms. Such imidazolines, in combination with mercaptothiazols, impart particularly good rust-inhibiting and emulsion properties to soluble oil.

Reaction products according to the invention can be prepared, for example, by bringing together the respective reactants, the imidazoline reactant being at a temperature such that it is at least partially in liquid phase. Since imidazolines as specified above are either liquids or low-melting solids, little or no external preheating of the imidazoline reactant or of the reaction mixture is required. The reaction, once initiated, however, is exothermic, and the temperature of the reaction mixture rises during the course of the reaction.

Reaction products according to the invention are oily viscous liquids or low melting solids, which are soluble in soluble oil in at least rust-inhibiting amounts. It has been found that the reaction products are sufficiently soluble that more mercaptothiazol can be stably incorporated in soluble oil in the form of the reaction products than can be incorporated in soluble oil when an attempt is made to dissolve the mercaptothiazol alone in the oil.

Where physical mixtures of imidazoline and alkali metal or alkaline earth mercaptide of a mercaptothiazol are added to soluble oil, the mixture is preferably added as a solution of the mercaptide in liquid imidazoline. It has been found that such physical mixtures are also sufficiently soluble that more of the mercaptothiazol can be stably incorporated in soluble oil in the form of the physical mixture with imidazoline than can be incorporated in soluble oil when an attempt is made to dissolve the mercaptothiazol alone in the oil.

Soluble oils generally may be inhibited against rusting according to the present invention. Soluble oils frequently contain light lubricating oil, e. g. oil having S. U. viscosity at 100° F. of about 150 seconds, but other lubricating oil can be used. Alkali metal soaps of petroleum naphthenic acids are frequently used as emulsifying agents, but others may be used, e. g. alkali metal soaps of rosin acids or fatty acids.

Soluble oils generally may be classified according to whether they contain excess alkalinity or excess acidity; alkaline oils are those which have excess alkalinity, the latter usually derived from excess alkali metal hydroxide in the soaps used as emulsifying agents; those oils which have excess acidity may be termed acidic soluble oils.

Additive materials according to the present invention may be added either to alkaline soluble oil or to acidic soluble oil. When an additive material comprising a mercaptothiazol-imidazoline reaction product is used in an alkaline soluble oil, there is a tendency for the reaction product to react with the excess alkaline materials, with resultant decrease in alkalinity of the oil, and probably with formation of an alkali metal mercaptide. Hydrolysis of the mercaptothiazol-imidazoline addition product is probably involved in this phenomenon. When an additive mixture comprising an alkali metal or alkaline earth metal mercaptide of a mercaptothiazol is used in an acidic soluble oil, there is a tendency for the mercaptide to react with the excess acidic materials, with resultant decrease in acidity of the oil, and probably with formation of mercaptothiazol. Regardless of what reactions may take place, however, alkaline, neutral, or acidic soluble oils may be effectively inhibited by use of any additive material as specified above.

The concentration of the rust-inhibiting additive material in soluble oil varies according to the nature of the additive material and the degree of rust inhibition desired. Generally, there is used an amount of additive material within the approximate range from 0.5 weight percent to the maximum amount which can be incorporated in the soluble oil without impairing the emulsion properties of the soluble oil. In the case of mercaptobenzothiazol-imidazoline additive materials, the maximum amount is about 2.0 weight percent. In the case of alkyl mercaptothiazolimidazoline additive materials, the maximum amount is about 3.0 weight percent. These maximum amounts, however, vary somewhat according to the nature of the imidazoline used and the nature of the soluble oil in which the additive material is incorporated.

The following examples illustrate the invention:

*Example I*

In this example, a reaction product of mercaptobenzothiazol and an imidazoline material was prepared as follows:

Eight parts by weight of mercaptobenzothiazol were stirred at room temperature into fifteen parts of a liquid-solid mixture, consisting predominantly of 1-hydroxyethyl-2-decyl imidazoline and 1-hydroxyethyl-2-dodecyl imidazoline, the mixture having an average molecular weight of about 276, a melting point of about 32° C., and a specific gravity of about 0.98. Heat was evolved upon addition of the mercaptobenzothiazol; the reaction was conducted in a water bath to prevent overheating. After stirring for about half an hour, the mixture was cooled to obtain a homogeneous, translucent, reddish, single phase liquid product. This product was found to be soluble in mineral soluble oil in rust-inhibiting concentrations.

*Example II*

In this example, two samples of soluble oil were tested for rust-inhibiting properties according to the "cast iron chip test" procedure as follows:

Four grams of cast iron chips are cleaned with naphtha and immersed in 100 ml. of an emulsion comprising 2 weight percent soluble oil and 98 percent of water having hardness equivalent to 300 p. p. m. CaCO$_3$. At five minute intervals, the emulsion and chips are stirred for a few seconds. After the third such stirring, the emulsion is decanted, and the chips are placed on an inverted watch glass and allowed to dry. When the chips are dry, the degree of rusting is evaluated by visual observation.

One of the soluble oil samples tested had the following approximate composition:

| | Weight percent |
|---|---|
| Lubricating oil (S. U. viscosity at 100° F. of 150) | 83.5 |
| Sodium soaps of petroleum naphthenic acids | 9.0 |
| Sodium soaps of petroleum sulfonic acids | 4.5 |
| Coupling agent | 0.5 |
| Water | 2.5 |
| | 100.0 |

This oil was an alkaline soluble oil containing about 0.06 per cent excess sodium hydroxide.

The second soluble oil sample tested had the same approximate composition, except that it contained in addition one weight percent of the mercaptothiazol-imidazoline reaction product prepared as described in Example I.

The first sample above failed the test, since rust was observed on the chips after the test. The second sample passed the test since no rust was observed.

This example shows that soluble oil containing a reaction product of mercaptobenzothiazol and certain imidazoline material is perfect in rust-inhibiting properties as measured in the above test. Also such soluble oil is satisfactory in emulsion properties, no substantial phase separation being observed when the second sample above is allowed to stand.

*Example III*

In this example, two samples of soluble oil were tested for rust-inhibiting properties according to the cast iron chip test, the procedure being the same as described in Example II, except that instead of water having hardness equivalent to 300 p. p. m. of CaCO$_3$, distilled water was used to make the emulsions. The first of the soluble oil samples tested had the approximate same composition as that of the first soluble oil described in Example II above. The second of these soluble oil samples had the approximate same composition except that it contained in addition one weight percent of an additive mixture comprising the imidazoline material specified in Example II and the calcium mercaptide of mercaptobenzothiazol. This additive mixture had been previously prepared by dissolving 8 parts by weight of the mercaptide in 10 parts of the imidazoline material.

The second sample was satisfactory in emulsion properties, and was substantially superior to the first sample in rust inhibiting properties as measured by the cast iron chip test using distilled water.

This example shows that soluble oil can be effectively inhibited against rusting by incorporating therein an additive mixture comprising an imidazoline as herein specified and an alkaline earth metal mercaptide of mercaptobenzothiazol. This example also shows that additive mixtures according to the invention are capable of imparting rust inhibiting properties to soluble oil when used in distilled water emulsions, as well as when used in hard water emulsions.

*Example IV*

In this example, two acidic soluble oil samples were tested for rust-inhibiting properties according to the "cast iron plate test" procedure as follows:

On the surface of a polished cast iron plate, there is placed a drop of an emulsion comprising 2 weight percent of the soluble oil and 98 percent distilled water. The drop is allowed to evaporate under ordinary room conditions. The soluble oil is considered to pass the test if there is no visible change in the plate after evaporation of the drop.

One of the soluble oil samples tested had the following approximate compositions:

| | Weight percent |
|---|---|
| Lubricating oil ( S. U. viscosity at 100° F. of 86 seconds | 82.2 |
| Sodium soaps of rosin acids | 7.1 |
| Sodium soaps of petroleum sulfonic acids | 7.1 |
| Water | 2.3 |
| Other components | 1.3 |
| | 100.0 |

The second one of the soluble oil samples tested had the same approximate composition, except that it contained in addition one weight percent of the reaction product prepared as described in Example I.

The second sample, containing the mercaptobenzothiazolimidazoline reaction product, passed the test, no staining of the plate being observed at the end of the test. The first sample, however, failed the test, because the sample left a stain on the plate at the end of the test.

This example shows that acidic soluble oil, as well as alkaline soluble oil, can be inhibited against rusting by means of additive material according to the invention. The second soluble oil sample was satisfactory in emulsion properties.

*Example V*

In this example there was prepared according to the method described in Example I a reaction product of the imidazoline material described in Example I with a mercaptothiazol material comprising a mixture of 15 parts of 4-ethyl mercaptothiazol and 85 parts of 4,5-dimethyl mercaptothiazol. The product obtained was found to be soluble in mineral soluble oil in rust-inhibiting concentrations.

*Example VI*

In this example, two samples of soluble oil were tested for rust-inhibiting properties according to the cast iron chip test described in Example II. The first soluble oil sample tested had the same approximate composition as the first soluble oil sample tested in Example 11. The second sample had the same approximate composition, except that it contained in addition about one weight percent of the mercaptothiazol-imidazoline reaction product prepared as described in Example V.

The second sample was satisfactory in emulsion properties and was substantially superior to the first sample in rust inhibiting properties as measured by the cast iron chip test using distilled water.

This example shows that the imidazoline reaction products of alkyl mercaptothiazols, as well as of mercaptoarylthiazols, are suitable rust-inhibiting additives for soluble oil.

Although in the above examples a mixture of 1-hydroxyethyl-2-dodecyl imidazoline and 1-hydroxyethyl-2-decyl imidazoline is used as an example of an imidazoline material which can be used in additive materials according to the invention, similar results may be obtained when other imidazoline materials within the scope of the invention are used, e. g. 1-aminoethyl-2-heptadecyl imidazoline, 2-hendecyl imidazoline, 2-heptadecyl imidazoline, 1-hydroxyethyl-2-octyl imidazoline, 1-hydroxyisopropyl-2-heptadecyl-4-methyl imidazoline, etc. As mentioned previously, preferred imidazolines are those in which the 2-substituent contains 10–12 carbon atoms, and the 1-substituent has molecular weight 25–50, e. g. 1-hydroxyethyl-2-decyl imidazoline or 1-hydroxyethyl-2-dodecyl imidazoline used alone, 1-hydroxyethyl-2-hendecyl imidazoline, 1-ethyl-2-hendecyl imidazoline, etc.

I claim:

1. The salt of (1) a 2-mercaptothiazol selected from the group consisting of mercaptobenzothiazol and compounds having the formula:

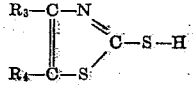

where $R_3$ and $R_4$ are each selected from the group consisting of hydrogen and lower alkyl radicals and (2) an imidazoline having the formula:

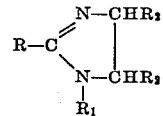

where R is an aliphatic hydrocarbon radical of a naturally occurring fatty acid, said radical having 8 to 20 carbon atoms, $R_1$ is a radical having molecular weight less than about 75 and selected from the group consisting of hydrogen atoms, alkyl hydrocarbon radicals, hydroxyalkyl radicals, and aminoalkyl radicals, and $R_2$ is selected from the group consisting of hydrogen and lower alkyl radicals.

2. A salt according to claim 1, wherein R is an aliphatic radical having 10–12 carbon atoms, $R_1$ is a radical having molecular weight about 25–50, and $R_2$ is hydrogen.

3. A salt according to claim 1 wherein $R_1$ is a hydroxyethyl radical.

4. A salt according to claim 1 wherein said 2-mercaptothiazol is 2-mercaptobenzothiazol.

5. A salt according to claim 1 wherein said 2-mercaptothiazol is 4-ethyl-2-mercaptothiazol.

6. A salt according to claim 1 wherein said 2-mercaptothiazol is 4,5-dimethyl-2-mercaptothiazol.

7. The salt of 2-mercaptobenzothiazol and an imidazoline mixture comprising 1-hydroxyethyl-2-decyl imidazoline and 1-hydroxyethyl-2-dodecyl imidazoline.

8. The salt of a mixture of 4-ethyl-2-mercaptothiazol and 4,5-dimethyl-2-mercaptothiazol with an imidazoline material comprising 1-hydroxyethyl-2-decyl imidazoline and 1-hydroxyethyl-2-dodecyl imidazoline.

9. A mineral soluble oil capable of forming stable emulsions in water and containing an emulsifying agent and a rust-inhibiting quantity of an additive material selected from the group consisting of: salts of (1) a 2-mercaptothiazol selected from the group consisting of mercaptobenzothiazol and compounds having the formula:

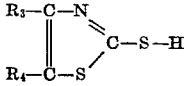

where $R_3$ and $R_4$ are each selected from the group consisting of hydrogen and lower alkyl radicals and (2) an imidazoline having the formula:

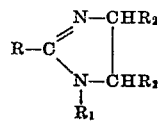

where R is an aliphatic hydrocarbon radical of a naturally occurring fatty acid, said radical having 8 to 20 carbon atoms, $R_1$ is a radical having molecular weight less than about 75 and selected from the group consisting of hydrogen atoms, alkyl hydrocarbon radicals, hydroxyalkyl radicals, and aminoalkyl radicals, and $R_2$ is selected from the group consisting of hydrogen and lower alkyl radicals; physical mixtures of such imidazoline and an alkali metal mercaptide of such 2-mercaptothiazol; and physical mixtures of such imidazoline and an alkaline earth metal mercaptide of such 2-mercaptothiazol.

10. Composition according to claim 9 wherein R is an aliphatic radical having 10–12 carbon atoms, $R_1$ is a radical having molecular weight about 25–50, and $R_2$ is hydrogen.

11. Composition according to claim 9 wherein $R_1$ is a hydroxyethyl radical.

12. Composition according to claim 9 wherein said 2-mercaptothiazol comprises 2-mercaptobenzothiazol.

13. Composition according to claim 9 wherein said 2-mercaptothiazol comprises 4-ethyl-2-mercaptothiazol.

14. Composition according to claim 9 wherein said 2-mercaptothiazol comprises 4,5-dimethyl-2-mercaptothiazol.

15. Composition according to claim 9 wherein said 2-mercaptothiazol comprises 2-mercaptobenzothiazol and said imidazoline is a mixture of 1-hydroxyethyl-2-decyl imidazoline and 1-hydroxyethyl-2-dodecyl imidazoline.

16. Composition according to claim 9 wherein said 2-mercaptothiazol comprises 4-ethyl-2-mercaptothiazol and 4,5-dimethyl-2-mercaptothiazol and said imidazoline is a mixture of 1-hydroxyethyl-2-decyl imidazoline and 1-hydroxyethyl-2-dodecyl imidazoline.

References Cited in the file of this patent

UNITED STATES PATENTS

| | | |
|---|---|---|
| 2,437,170 | Minich | Mar. 2, 1948 |
| 2,439,734 | Himel et al. | Apr. 13, 1948 |
| 2,474,237 | Eby | June 28, 1949 |